US012615273B2

(12) United States Patent
Tan et al.

(10) Patent No.: US 12,615,273 B2
(45) Date of Patent: Apr. 28, 2026

(54) INFORMATION PROCESSING

(71) Applicant: Alipay (Hangzhou) Information Technology Co., Ltd., Zhejiang (CN)

(72) Inventors: Huazhe Tan, Hangzhou (CN); Qi Weng, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 102 days.

(21) Appl. No.: 18/540,029

(22) Filed: Dec. 14, 2023

(65) Prior Publication Data

US 2024/0114045 A1      Apr. 4, 2024

Related U.S. Application Data

(63) Continuation of application No. PCT/CN2022/108503, filed on Jul. 28, 2022.

(30) Foreign Application Priority Data

Aug. 19, 2021    (CN) ......................... 202110952741.X

(51) Int. Cl.
*G06F 21/00* (2013.01)
*H04L 9/40* (2022.01)

(52) U.S. Cl.
CPC ...... *H04L 63/1425* (2013.01); *H04L 63/0823* (2013.01); *H04L 63/083* (2013.01); *H04L 63/1433* (2013.01)

(58) Field of Classification Search
CPC ............. H04L 63/1425; H04L 63/0823; H04L 63/083; H04L 63/1433; G06Q 20/326;
(Continued)

(56) References Cited

U.S. PATENT DOCUMENTS 11,669,825 B2 * 6/2023 Jackets .............. G06Q 20/3558
                                                                  235/380
12,069,083 B2 * 8/2024 Hawthorn ........... H04L 63/1433
                       (Continued)

FOREIGN PATENT DOCUMENTS

CN        106878245 A      6/2017
CN        107038576 A      8/2017
            (Continued)

OTHER PUBLICATIONS

Extended European Search Report in European Appln. No. 22857548. 6, mailed on Jul. 18, 2024, 10 pages.
(Continued)

*Primary Examiner* — Kendall Dolly

(74) *Attorney, Agent, or Firm* — Fish & Richardson P.C.

(57) ABSTRACT

Information processing performed by an information code server end includes receiving an information code processing request from a second client, where the information code processing request is sent after the second client scans a third-party information code embedded in a first client. To obtain identified risk information, risk identification is performed based on the information code processing request. Based on the identified risk information and a predetermined security rule, corresponding processing logic is executed. A processing result of the corresponding processing logic is sent to the first client.

20 Claims, 10 Drawing Sheets

In response to a trigger event of opening a third-party information code, a first client presents an interface that includes the third-party information code, so that a second client scans the third-party information code, and triggers processing logic of the third-party information code ⟍ 101

After obtaining a processing result of the processing logic, the first client presents an interface that includes the processing result ⟍ 103

(58) Field of Classification Search

CPC .......... G06Q 20/3274; G06Q 20/3276; G06Q 20/385; G06Q 20/4016; G06Q 20/405; G06Q 20/32

See application file for complete search history.

(56) References Cited

U.S. PATENT DOCUMENTS

| | | | | |
|---|---|---|---|---|
| 2013/0218721 | A1* | 8/2013 | Borhan | G06Q 30/02 705/26.41 |
| 2013/0218765 | A1 | 8/2013 | Hammad et al. | |
| 2015/0039455 | A1 | 2/2015 | Luciani et al. | |
| 2022/0051252 | A1* | 2/2022 | Segal | G06Q 20/4016 |

FOREIGN PATENT DOCUMENTS

| | | | |
|---|---|---|---|
| CN | 107578238 | | 1/2018 |
| CN | 107730249 | | 2/2018 |
| CN | 109118183 | A | 1/2019 |
| CN | 109191108 | | 1/2019 |
| CN | 109471570 | | 3/2019 |
| CN | 111415143 | A | 7/2020 |
| CN | 212873646 | | 4/2021 |
| CN | 112837051 | A | 5/2021 |
| WO | WO 2013/082190 | | 6/2013 |
| WO | WO-2013082190 | A1 * | 6/2013 .......... G06F 21/577 |
| WO | WO 2020/119486 | | 6/2020 |

OTHER PUBLICATIONS

International Preliminary Report on Patentability in Appln. No. PCT/CN2022/108503, mailed on Feb. 29, 2024, 10 pages (with English translation).

International Search Report and Written Opinion in Appln. No. PCT/CN2022/108503, mailed on Oct. 22, 2022, 13 pages (with English translation).

Zhuanlan.zhihu.com [online], "Just scan and the money will be deducted immediately. Don't you want to know the principle behind the payment code?," Apr. 16, 2020, retrieved on Jul. 11, 2025, retrieved from URL<https://zhuanlan.zhihu.com/p/131346742>,13 pages (with Machine translation).

* cited by examiner

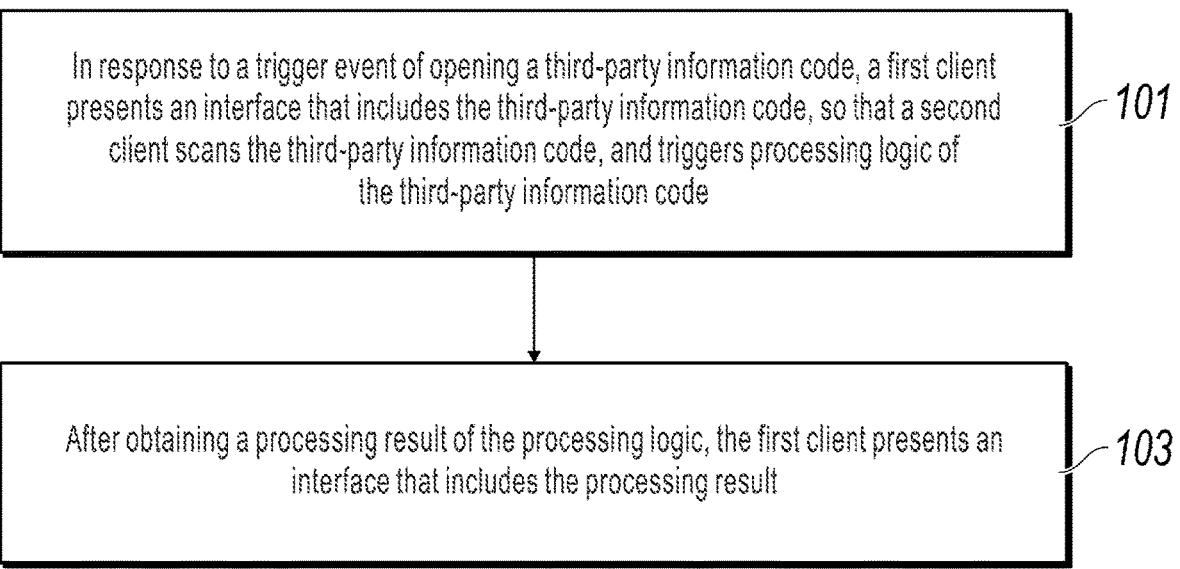

In response to a trigger event of opening a third-party information code, a first client presents an interface that includes the third-party information code, so that a second client scans the third-party information code, and triggers processing logic of the third-party information code — 101

After obtaining a processing result of the processing logic, the first client presents an interface that includes the processing result — 103

FIG. 1

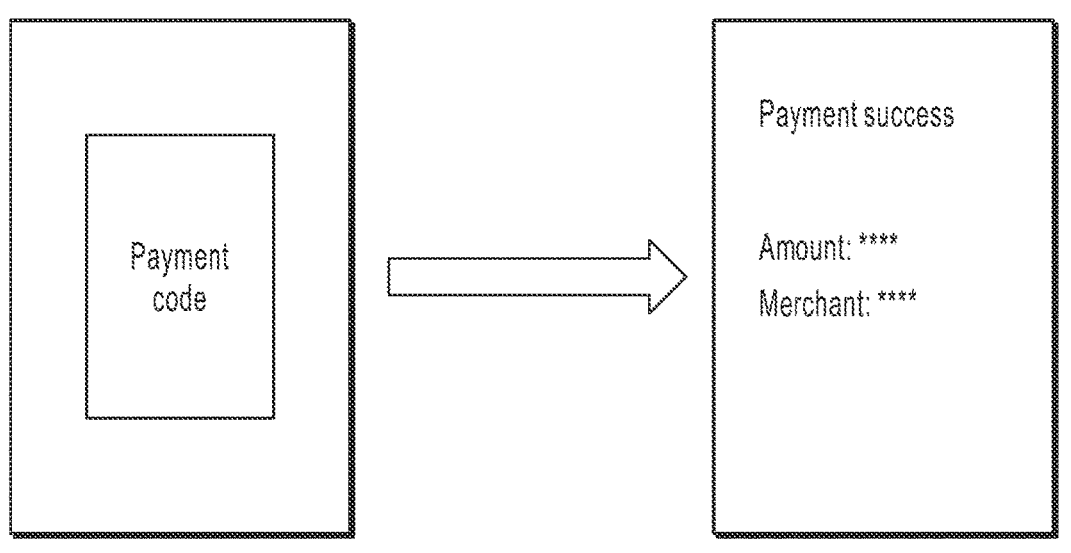

Payment code

Payment success

Amount: ****

Merchant: ****

FIG. 2a

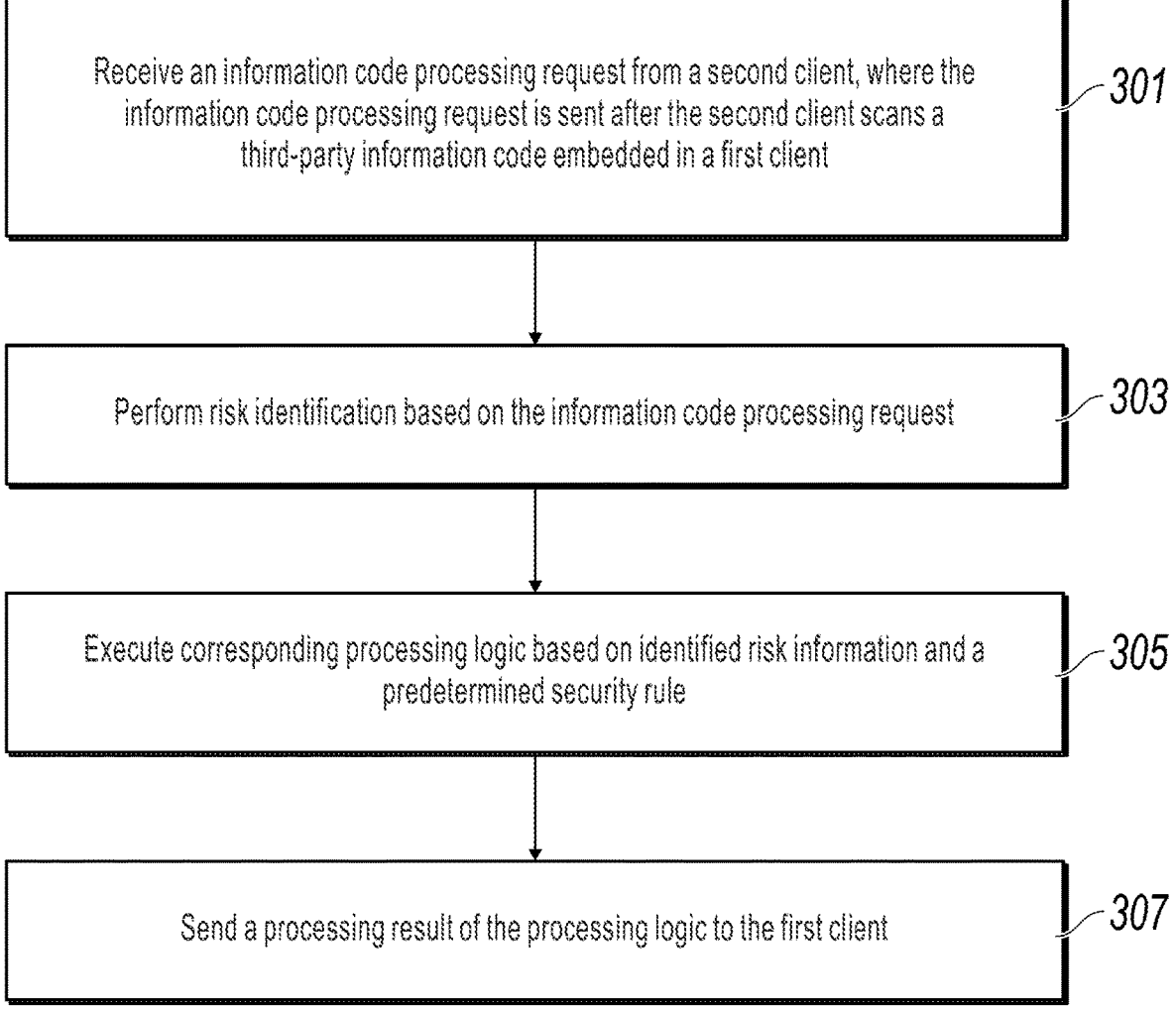

Receive an information code processing request from a second client, where the information code processing request is sent after the second client scans a third-party information code embedded in a first client ⟋301

Perform risk identification based on the information code processing request ⟋303

Execute corresponding processing logic based on identified risk information and a predetermined security rule ⟋305

Send a processing result of the processing logic to the first client ⟋307

FIG. 3

INFORMATION PROCESSING

CROSS-REFERENCE TO RELATED APPLICATIONS

This application is a continuation of PCT Application No. PCT/CN2022/108503, filed on Jul. 28, 2022, which claims priority to Chinese Patent Application No. 202110952741.X, filed on Aug. 19, 2021, and each application is hereby incorporated by reference in its entirety.

TECHNICAL FIELD

One or more embodiments of this specification relate to the field of computer application technologies, and in particular, to information processing methods and apparatuses.

BACKGROUND

With rapid development of computer and Internet technologies, human production and life become more convenient. As a popular encoding scheme for mobile devices in recent years, an information code technology such as barcodes and QR codes brings great convenience to application scenarios such as payment, check-in, and information acquisition. For example, for a financial application, a payment code of a current financial institution is often embedded in the financial application, and a user can open the payment code for scanning by a manufacturer to complete payment. However, for security reasons, information codes such as payment codes currently can be used only on a client of the current financial institution. Consequently, the user needs to install clients of various financial applications on a terminal device, causing inconvenience in resource occupation and use.

SUMMARY

One or more embodiments of this specification describe information processing methods and apparatuses, to improve convenience of using an information code and reduce resource occupation of a terminal device.

According to a first aspect, an information processing method is provided. The method is performed by an information code server end, and includes the following: receiving an information code processing request from a second client, where the information code processing request is sent after the second client scans a third-party information code embedded in a first client; performing risk identification based on the information code processing request; executing corresponding processing logic based on identified risk information and a predetermined security rule; and sending a processing result of the processing logic to the first client.

In some embodiments, the performing risk identification based on the information code processing request includes the following: obtaining the risk information through identification based on at least one of transaction information, device information, environment information, and time information that are included in the information code processing request; or querying for historical data of the user based on user information included in the information code processing request, and obtaining the risk information through identification based on the historical data of the user.

In some other embodiments, the executing corresponding processing logic based on identified risk information and a predetermined security rule includes the following: querying for the predetermined security rule based on the identified risk information, to determine whether to perform security verification; and in response to determining to perform security verification, performing security verification corresponding to the risk information, and then executing the processing logic corresponding to the information code; or in response to determining not to perform security verification, executing the processing logic corresponding to the information code.

In some embodiments, the security verification includes user confirmation, password verification, digital certificate verification, password and digital certificate verification, or a redirect to a client corresponding to the third-party information code.

In some other embodiments, the password verification includes the following: determining, based on user information included in the information code processing request, password type information and first password information that are most recently set by a user; sending a password verification message that includes the password type information to the first client; and obtaining second password information sent by the first client, and performing verification by using the second password information and the first password information.

In some embodiments, the digital certificate verification includes the following: determining, based on user information included in the information code processing request, first digital certificate information corresponding to the user information; sending a message for verifying a digital certificate to the first client; and obtaining second digital certificate information sent by the first client, and performing verification by using the second digital certificate information and the first digital certificate information.

In some other embodiments, the password and digital certificate verification includes the following: determining, based on user information included in the information code processing request, password type information, first password information, and first digital certificate information that correspond to the user information; sending a message for verifying a password and a digital certificate to the first client; and obtaining second password information and second digital certificate information that are sent by the first client, and performing verification by using the first password information, the second password information, the first digital certificate information, and the second digital certificate information.

In some embodiments, the information code includes a payment code, and the processing logic includes payment processing.

According to a second aspect, an information processing method is provided. The method is performed by a first client, and includes the following: in response to a trigger event of opening a third-party information code, presenting an interface that includes the third-party information code, so that a second client scans the third-party information code, and triggers processing logic of the third-party information code; and after a processing result of the processing logic that is sent by an information code server end is obtained, presenting an interface that includes the processing result.

In some embodiments, the trigger event of opening the third-party information code includes the following: a user triggers a component for opening the third-party information code in the first client; or a user performs a predetermined gesture operation on a lock screen.

In some other embodiments, the method further includes the following: after a password verification message that includes password type information and is sent by the information code server end is received, presenting a prompt interface for inputting a password of the type, and sending, to the information code server end, second password information input by the user; or sending second digital certificate information to the information code server end after a message that is used for verifying a digital certificate and is sent by the information code server end is received; or after a message that is used for verifying a password and a digital certificate and is sent by the information code server end is received, presenting a prompt interface for inputting a password of the type, and sending, to the information code server end, second digital certificate information and second password information input by the user, where the message includes password type information.

According to a third aspect, an information processing apparatus is provided. The apparatus is disposed on an information code server end. The apparatus includes: a receiving unit, configured to receive an information code processing request from a second client, where the information code processing request is sent after the second client scans a third-party information code embedded in a first client; an identification unit, configured to perform risk identification based on the information code processing request; an execution unit, configured to execute corresponding processing logic based on identified risk information and a predetermined security rule; and a sending unit, configured to send a processing result of the processing logic to the first client.

In some embodiments, the identification unit is specifically configured to obtain the risk information through identification based on at least one of transaction information, device information, environment information, and time information that are included in the information code processing request; or query for historical data of the user based on user information included in the information code processing request, and obtain the risk information through identification based on the historical data of the user.

In some other embodiments, the execution unit includes: a determining subunit, configured to query for the predetermined security rule based on the identified risk information, to determine whether to perform security verification; a verification subunit, configured to: if the determining subunit determines to perform security verification, perform security verification corresponding to the risk information; and an execution subunit, configured to: if the security verification is passed, execute the processing logic corresponding to the information code; or if the determining subunit determines not to perform security verification, execute the processing logic corresponding to the information code.

In some embodiments, the security verification includes user confirmation, password verification, digital certificate verification, password and digital certificate verification, or a redirect to a client corresponding to the third-party information code.

In some other embodiments, when performing password verification, the verification subunit is specifically configured to determine, based on user information included in the information code processing request, password type information and first password information that are most recently set by a user; send a password verification message that includes the password type information to the first client; and obtain second password information sent by the first client, and perform verification by using the second password information and the first password information.

In some embodiments, when performing digital certificate verification, the verification subunit is specifically configured to determine, based on user information included in the information code processing request, first digital certificate information corresponding to the user information; send a message for verifying a digital certificate to the first client; and obtain second digital certificate information sent by the first client, and perform verification by using the second digital certificate information and the first digital certificate information.

In some other embodiments, when performing password and digital certificate verification, the verification subunit is specifically configured to determine, based on user information included in the information code processing request, password type information, first password information, and first digital certificate information that correspond to the user information; send a message for verifying a password and a digital certificate to the first client; and obtain second password information and second digital certificate information that are sent by the first client, and perform verification by using the first password information, the second password information, the first digital certificate information, and the second digital certificate information.

In some embodiments, the information code includes a payment code, and the processing logic includes payment processing.

According to a fourth aspect, an information processing apparatus is provided. The apparatus is disposed on a first client. The apparatus includes: a presentation unit, configured to: in response to a trigger event of opening a third-party information code, present an interface that includes the third-party information code, so that a second client scans the third-party information code, and triggers processing logic of the third-party information code; and an interaction unit, configured to obtain a processing result of the processing logic that is sent by an information code server end, where the presentation unit is further configured to present an interface that includes the processing result.

In some embodiments, the trigger event of opening the third-party information code includes the following: a user triggers a component for opening the third-party information code in the first client; or a user performs a predetermined gesture operation on a lock screen.

In some embodiments, the interaction unit is further configured to receive a password verification message that includes password type information and is sent by the information code server end, and send, to the information code server end, second password information input by the user; or receive a message that is used for verifying a digital certificate and is sent by the information code server end, and send second digital certificate information to the information code server end; or receive a message that is used for verifying a password and a digital certificate and is sent by the information code server end, and send second digital certificate information to the information code server end; and the presentation unit is further configured to present a prompt interface for inputting a password of the type.

According to a fifth aspect, a computing device is provided, including a memory and a processor. The memory stores executable code, and when executing the executable code, the processor implements the method of the first aspect.

According to the methods and the apparatuses provided in the embodiments of this specification, the third-party information code is embedded in the first client, so that the user does not need to install clients of information codes one by one, thereby reducing resource occupation of the terminal device and improving convenience of using the information code.

In addition, at the information code server end, risk identification and the security rule are used to ensure security of the processing logic corresponding to the information code.

BRIEF DESCRIPTION OF DRAWINGS

To describe the technical solutions in the embodiments of this application or in the existing technology more clearly, the following briefly describes the accompanying drawings needed for describing the embodiments or the existing technology. Clearly, the accompanying drawings in the following description show some embodiments of this application, and a person of ordinary skill in the art can still derive other drawings from these accompanying drawings without creative efforts.

FIG. 1 is a flowchart illustrating an information processing method, according to some embodiments;

FIG. 2*a* is a schematic diagram illustrating a method for embedding a third-party payment code, according to some embodiments;

FIG. 3 is a flowchart illustrating an information processing method, according to some embodiments;

DESCRIPTION OF EMBODIMENTS

Figure 2B:
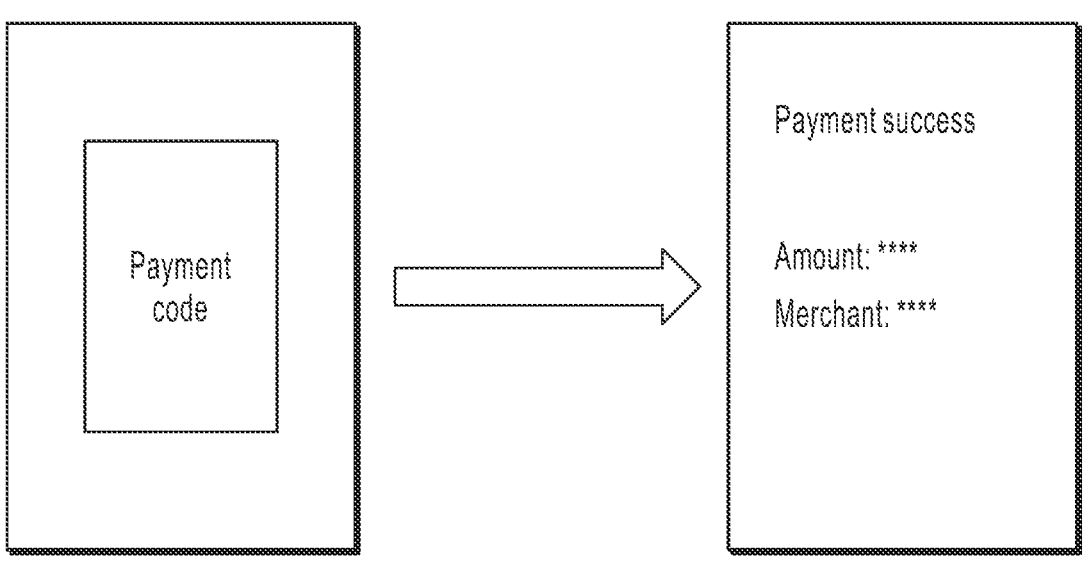
FIG. 2*b* is a schematic diagram illustrating a redirect from an interface that includes a payment code to an interface that includes payment success information, according to some embodiments.

The following describes the solutions provided in this specification with reference to the accompanying drawings.

The core idea of this specification is that third-party information codes can be embedded in a client, so that a user does not need to install clients of the information codes one by one, thereby reducing resource occupation of a terminal device and improving convenience of using the information code.

The following describes specific implementations of the above-mentioned concept.

FIG. 1 is a flowchart illustrating an information processing method, according to some embodiments. The method is performed by a first client. A third-party information code is embedded in the first client. As shown in FIG. 1, the method includes the following steps.

Step 101: In response to a trigger event of opening the third-party information code, the first client presents an interface that includes the third-party information code, so that a second client scans the third-party information code, and triggers processing logic of the third-party information code.

Step 103: After obtaining a processing result of the processing logic, the first client presents an interface that includes the processing result.

The following describes execution methods of the steps shown in FIG. 1. In the technical solution provided in the embodiments of this application, the information code can be a graph, for example, a barcode or a QR code, that can include encoded information. The QR code is used as an example for description in subsequent embodiments of the disclosure. In addition, the information code can be used to perform functions such as payment, transfer, check-in, and provision of identity information. The payment code is used as an example to complete the payment function in subsequent embodiments.

"In response to a trigger event of opening the third-party information code, the first client presents an interface that includes the third-party information code, so that a second client scans the third-party information code, and triggers processing logic of the third-party information code" in step 101 is first described in detail.

The trigger event of opening the third-party information code can include but is not limited to the following two methods.

Method 1: A user triggers a component for opening the third-party information code in the first client.

When the third-party information code is embedded in the first client, a link of the third-party information code is usually presented in the first client in a form of a component. As shown in FIG. 2*a*, the first client can be a "wallet" client, and the third-party payment code can be embedded in the "wallet" client in a form of a card. After the user taps the card, the third-party payment code is presented.

Method 2: A user performs a predetermined gesture operation on a lock screen.

To open the third-party information code more conveniently, the first client can set a shortcut gesture of the lock screen as the predetermined gesture operation, for example, double-tapping the lock screen. After the user double-taps the lock screen, the first client presents the third-party information code to the user.

In addition to the above-mentioned methods, another event, for example, invoking an interface that includes the third-party information code in the first client through voice, can be used as the trigger event of opening the third-party information code.

The second client can be a client configured to obtain information from the third-party information code. For example, a client of a merchant scans a third-party payment code embedded in a "wallet" client of a user, to implement a payment function of a product or a service provided by the merchant. For another example, a client of a company scans a third-party check-in code embedded in a client of an employee, to implement a check-in function of the employee in the company.

The second client usually triggers the processing logic of the third-party information code by sending a processing request to a server (referred to as an "information code server" in this specification) of the third-party information code. The information code server completes the corresponding processing logic, and sends a processing result to the first client. In addition, the information code server can further return the processing result to the second client.

For example, the second client sends a code payment request to the information code server, and after completing a payment procedure, the information code server sends a payment processing result to the first client and the second client.

The following describes "after obtaining a processing result of the processing logic, the first client presents an interface that includes the processing result" in step 103 in detail.

After the information code server sends the processing result to the first client, the first client can present, in the following methods, for example, the interface that includes the processing result.

Method 1: Redirect from a current interface to the interface that includes the processing result of the processing logic. The processing result can include information indicating whether the processing succeeds, and can further include other information related to the processing logic.

As shown in FIG. 2b, a redirect is made from an interface that includes a payment code to an interface that includes payment success information. The interface can include a payment amount, transaction related information, etc. in addition to the payment success information.

Method 2: Present, in a form of a notification message, the interface that includes the processing result of the processing logic.

Figure 2C:
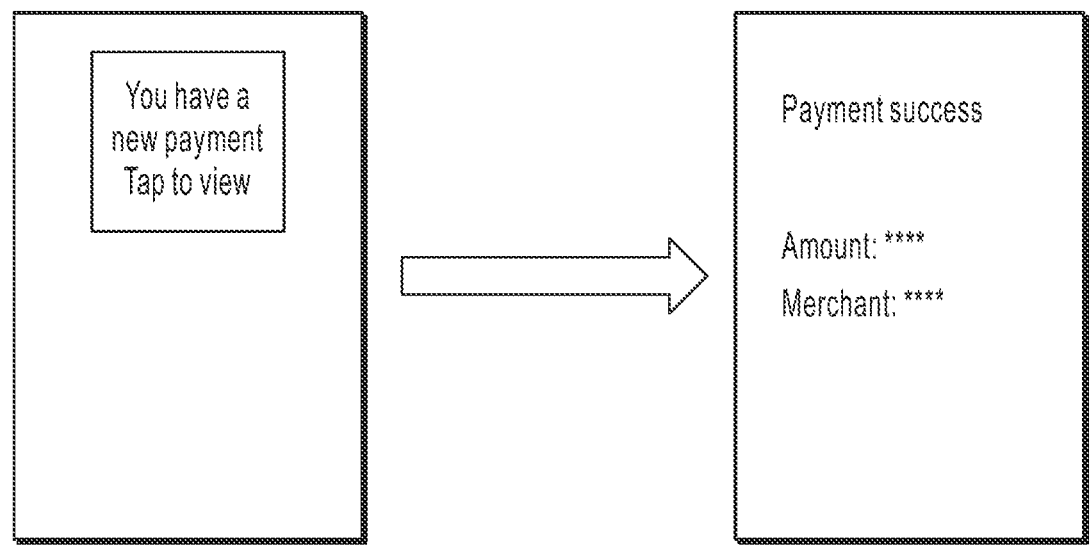
FIG. 2*c* is a schematic diagram illustrating an interface for presenting a processing result in a form of a notification message, according to some embodiments.

As shown in FIG. 2c, a notification message is displayed on an interface. In FIG. 2c, an example that the notification message is displayed from the top of a screen is used, but this display location and form of the notification message do not constitute a limitation. When the user taps the notification message, information including payment success is presented. The interface can include a payment amount, transaction related information, etc. in addition to the payment success information.

The presentation operation involved in this application can include but is not limited to at least one of a rendering operation and a display operation. This is not specifically limited in the embodiments. Specifically, content presented by an execution body is a rendering result output by the rendering operation. The rendering operation can be performed by a rendering engine in a network-side server based on page source code of a target page. Then the rendering result is stored in a form of a bitmap image, a vector image, etc., and is provided for the execution body to output the rendering result. Or the rendering operation can be performed by the execution body based on page source code of a target page, and then the execution body directly outputs the rendering result.

FIG. 3 is a flowchart illustrating an information processing method, according to some embodiments. The method is performed by an information code server end. The information code server end can be a server, or can be a server cluster including a plurality of servers. As shown in FIG. 3, the method can include the following steps.

Step 301: Receive an information code processing request from a second client, where the information code processing request is sent after the second client scans a third-party information code embedded in a first client.

Step 303: Perform risk identification based on the information code processing request.

Step 305: Execute corresponding processing logic based on identified risk information and a predetermined security rule.

Step 307: Send a processing result of the processing logic to the first client.

Because some information codes such as payment codes have very high requirements for security. In some feasible methods, related functions of the first client can be implemented by providing a software development kit (SDK) for the first client. However, in these methods, a third-party SDK needs to be integrated into the first client.

In some implementations, the SKD is not provided for the first client, and the functions are implemented by code of the first client. Therefore, risk identification and the security rule in the embodiments shown in FIG. 3 need to be used to ensure security of the processing logic.

The following describes execution methods of the steps shown in FIG. 3. "Perform risk identification based on the information code processing request" in step 303 is first described in detail.

In some feasible methods, the risk information can be obtained through identification based on at least one of transaction information, device information, and environment information that are included in the information code processing request.

Taking a payment code scenario as an example, the transaction information can include merchant information, a transaction amount, payment channel information, etc. For example, the transaction amount in the transaction information can be used as a basis, and it is considered that corresponding risks exist when the transaction amount exceeds predetermined different thresholds. For example, it can be considered that corresponding risks exist when a current transaction is determined as a fraud based on a plurality of pieces of information such as the merchant information and the transaction amount in the transaction information.

The device information can be a device type, an identifier of the device, etc. used by a user. For example, if a user uses a common device, it is considered that there is a low risk or there is no risk. If the user uses a device that is not commonly used, it is considered that certain risks exist.

The environment information can be a type of a network, an identifier of a network, etc. where the user is located. For example, if the user uses a common local area network, it is considered that a risk is relatively low. If the user uses a local area network that is not commonly used, it is considered that a certain risk exists.

The time information can be time information of scanning the information code by the second client, time information of sending the information code request, etc. For example, if a difference between the time information of scanning the information code by the second client and time information of presenting the information code exceeds a predetermined duration threshold, it is considered that a certain risk exists.

In some other feasible methods, historical data of the user can be queried for based on user information included in the information code processing request, and the risk information can be obtained through identification based on the historical data of the user.

The historical data of the user can include, for example, whether a password has been modified, whether a historical transaction behavior of the user is abnormal, etc.

The risk information can be represented by using risk scenario information. For example, the risk information is represented as "the user has modified a password", "a payment amount is greater than X and the user has an available digital certificate", "a payment amount is greater than an available balance of a current payment channel", "not a device commonly used by the user", "not a common network environment".

The risk information can alternatively be represented by using a risk level. For example, risks are classified into a high risk, a medium risk, and a low risk. For another example, risks are classified into a level-1 risk, a level-2 risk, a level-3 risk, and a level-4 risk.

"Execute corresponding processing logic based on identified risk information and a predetermined security rule" in step 305 is described in detail below.

The processing logic involved in this step can include a security verification portion and also includes processing logic of the information code. Whether to perform security verification and what kind of security verification is to be performed can be determined based on the risk information obtained through risk identification.

In some implementations, the predetermined security rule can be first queried for based on the identified risk information, to determine whether to perform security verification; and in response to determining to perform security verification, security verification corresponding to the risk information can be performed, and then the processing logic corresponding to the information code can be executed; or in response to determining not to perform security verification, the processing logic corresponding to the information code can be performed.

The security verification performed above can include user confirmation, password verification, digital certificate verification, password and digital certificate verification, or a redirect to a client corresponding to the third-party information code.

Content of the security rule actually includes a correspondence between risk information and security verification. For example, if a difference between time of scanning the information code and time of presenting the information code exceeds a predetermined duration threshold, for example, a payment code is requested for payment after the payment code is presented for over one minute, the security verification method of user confirmation can be used.

If a user password is modified, the security verification method of password verification can be used, where the password can include a personal identification number (PIN) password, or can include a biometric password such as fingerprint, face, or iris.

If a historical transaction behavior of the user is abnormal, the security verification method of password verification can be used.

If a payment amount exceeds X yuan, and the user does not have an available digital certificate, the certificate verification method is used.

If a payment amount exceeds Y yuan, and the user has an available digital certificate, the certificate verification method is used.

X and Y are predetermined amount thresholds.

If a payment amount is greater than an available balance of a current payment channel, the method of redirecting to the client corresponding to the third-party information code is used.

If a payment amount exceeds a predetermined payment limit, the method of redirecting to the client corresponding to the third-party information code is used.

If a current transaction is determined as a fraud, the method of redirecting to the client corresponding to the third-party information code is used.

The above-mentioned security rules are merely examples, and all security rules cannot be enumerated here. All replacements, conversions, or similar extensions within the spirit and the principle fall within the scope of this application.

The following describes the above-mentioned security verification methods. The user confirmation can include the following: sending a message for confirming the current processing logic to the first client; and after a request that includes "confirmed" information of the user and is returned by the first client is received within predetermined duration, considering that the current verification is passed; or if a request that includes "confirmed" information of the user and is returned by the first client is not received within predetermined duration, or a request that includes "unconfirmed" information of the user and is returned by the first client is received, considering that the current verification fails.

In this verification method, after receiving a request that includes confirmation information of the user, the first client presents a prompt interface for inputting the confirmation information by the user, and after obtaining the "confirmed" information or the "unconfirmed" information input by the user, sends the "confirmed" information or the "unconfirmed" information to the information code server end.

The password verification can include the following: determining, based on user information included in the information code processing request, password type information and first password information that are most recently set by the user; sending a password verification message that includes the password type information to the first client; and obtaining second password information sent by the first client, and performing verification by using the second password information and the first password information. If the first password information is consistent with the second password information, it is considered that the current verification is passed; otherwise, it is considered that the current verification fails.

In this verification method, after receiving the password verification message that includes the password type information and is sent by the information code server end, the first client presents a prompt interface for inputting a password of a corresponding type, and sends, to the information code server end, the second password information input by the user.

The digital certificate verification can include the following: determining, based on user information included in the information code processing request, first digital certificate information corresponding to the user information; sending a message for verifying a digital certificate to the first client; and obtaining second digital certificate information sent by the first client, and performing verification by using the second digital certificate information and the first digital certificate information. If the first digital certificate information is consistent with the second digital certificate information, it is considered that the current verification is passed; otherwise, it is considered that the current verification fails. The first digital certificate information can be signature information of the server end, and the second digital information can be signature information of the client.

In this verification method, the first client sends the second digital certificate information to the information code server end after receiving the message that is used for verifying a digital certificate and is sent by the information code server end.

The password and digital certificate verification can include the following: determining, based on user information included in the information code processing request, password type information and first password information that are most recently set by the user and first digital certificate information corresponding to the user information; sending a message for verifying a password and a digital certificate to the first client; and obtaining second password information and second digital certificate information that are sent by the first client, and performing verification by using the first password information, the second password information, the first digital certificate information, and the second digital certificate information.

In this verification method, after receiving the message that is used for verifying a password and a digital certificate and is sent by the information code server end, the first client presents a prompt interface for inputting a password of a corresponding type, and sends, to the information code server end, the second digital certificate information and the second password information input by the user.

The redirect to the client corresponding to the third-party information code includes the following: sending, to the first client, a link indicating to redirect to the client corresponding to the third-party information code, where the link includes processing logic information corresponding to the information code, for example, related payment information corresponding to a payment code. After receiving the link, the first client redirects to the client corresponding to the third-party information code, so that the client corresponding to the third-party information code interacts with the information code server to complete subsequent processing logic.

The following uses a payment procedure corresponding to a payment code as an example to describe the above-mentioned verification methods in detail with reference to specific embodiments.

Figure 4:
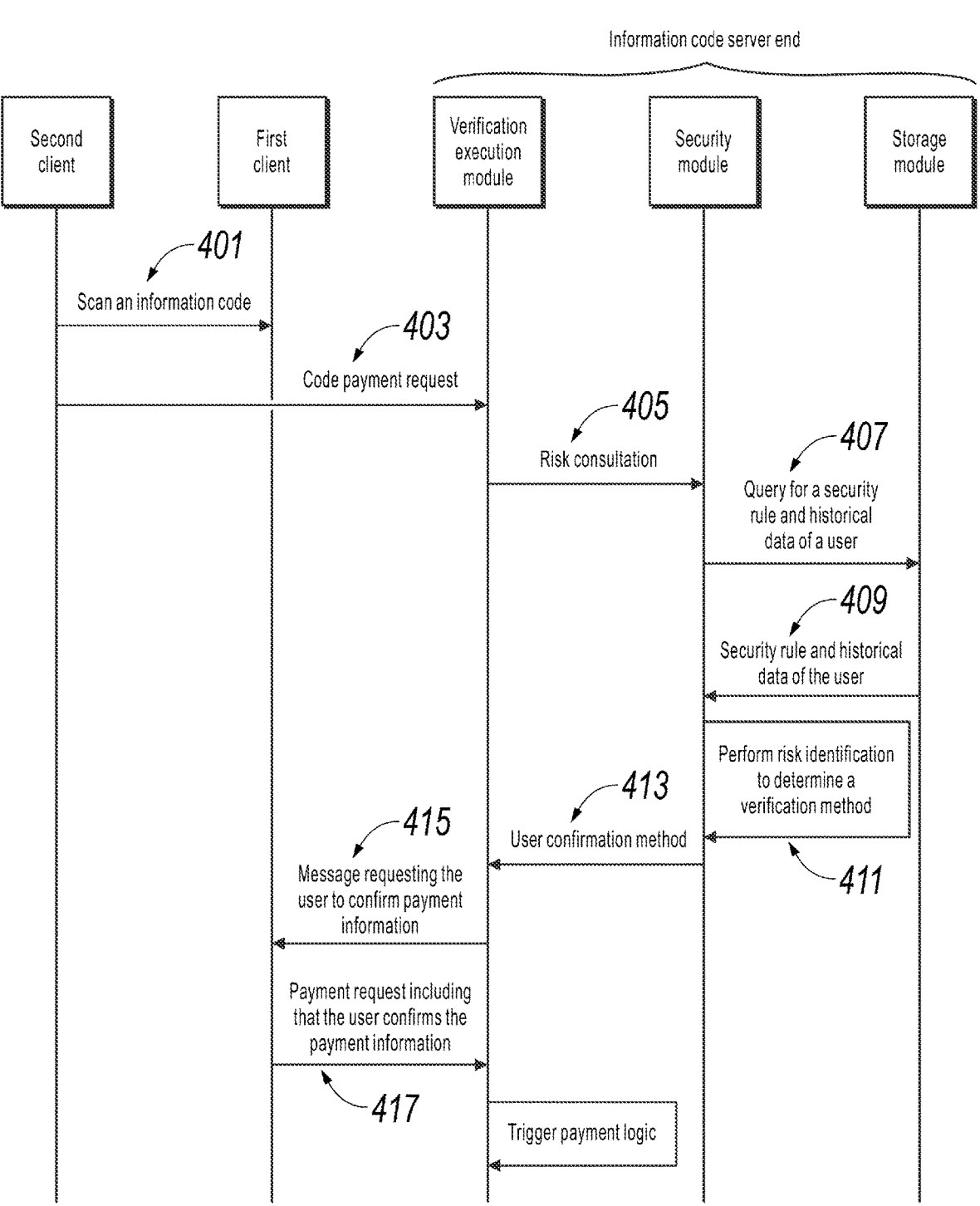
FIG. 4 is a flowchart illustrating use of a user confirmation method in a payment procedure, according to some embodiments.

FIG. 4 is a flowchart illustrating use of a user confirmation method in a payment procedure, according to some embodiments. As shown in FIG. 4, the procedure can include the following steps.

Step 401: A second client scans a third-party information code of a first client.

Step 403: The second client sends a code payment request to a verification execution module on an information code server end.

Step 405: The verification execution module performs risk consultation with a security module.

Step 407: The security module sends a query for a security rule and historical data of a user to a storage module.

Step 409: The storage module sends the security rule and the historical data of the user to the security module.

Step 411: The security module performs risk identification to determine a verification method to be used. In this procedure, it is determined that the user confirmation method is to be used.

Step 413: The security module notifies the verification execution module of information about the user confirmation method.

Step 415: The verification execution module sends a message requesting the user to confirm payment information to the first client.

After receiving the message, the first client presents, to the user, an interface requesting the user to confirm payment information, and the user can select "confirmed" or "unconfirmed" on the interface.

Step 417: The verification execution module triggers payment logic after obtaining a payment request including that the user confirms the payment information.

Triggering the processing logic actually means interacting with a payment server to complete user payment processing. For example, the payment server deducts a corresponding payment amount from a user account, to pay a merchant. This portion of payment logic can use an existing interaction processing procedure. Details are omitted here for simplicity.

For specific processing methods for sending the code payment request, performing risk identification, and determining the verification method in the above-mentioned procedure, references can be made to related descriptions in the above-mentioned method embodiments. Details are omitted here for simplicity in this procedure.

In addition, in the procedure shown in the above-mentioned embodiments and procedures shown in subsequent embodiments, the verification execution module, the security module, and the storage module can be disposed on a same server, or can be respectively disposed on different servers. Information can be forwarded between these modules by using other modules. The other modules are not shown in the figures. Information can be forwarded between the first client and the verification execution module and between the second client and the verification execution module by using a network device such as a routing device, an access device, or a forwarding device corresponding to the first client or the second client. These devices are not shown in the figures.

Figure 5:
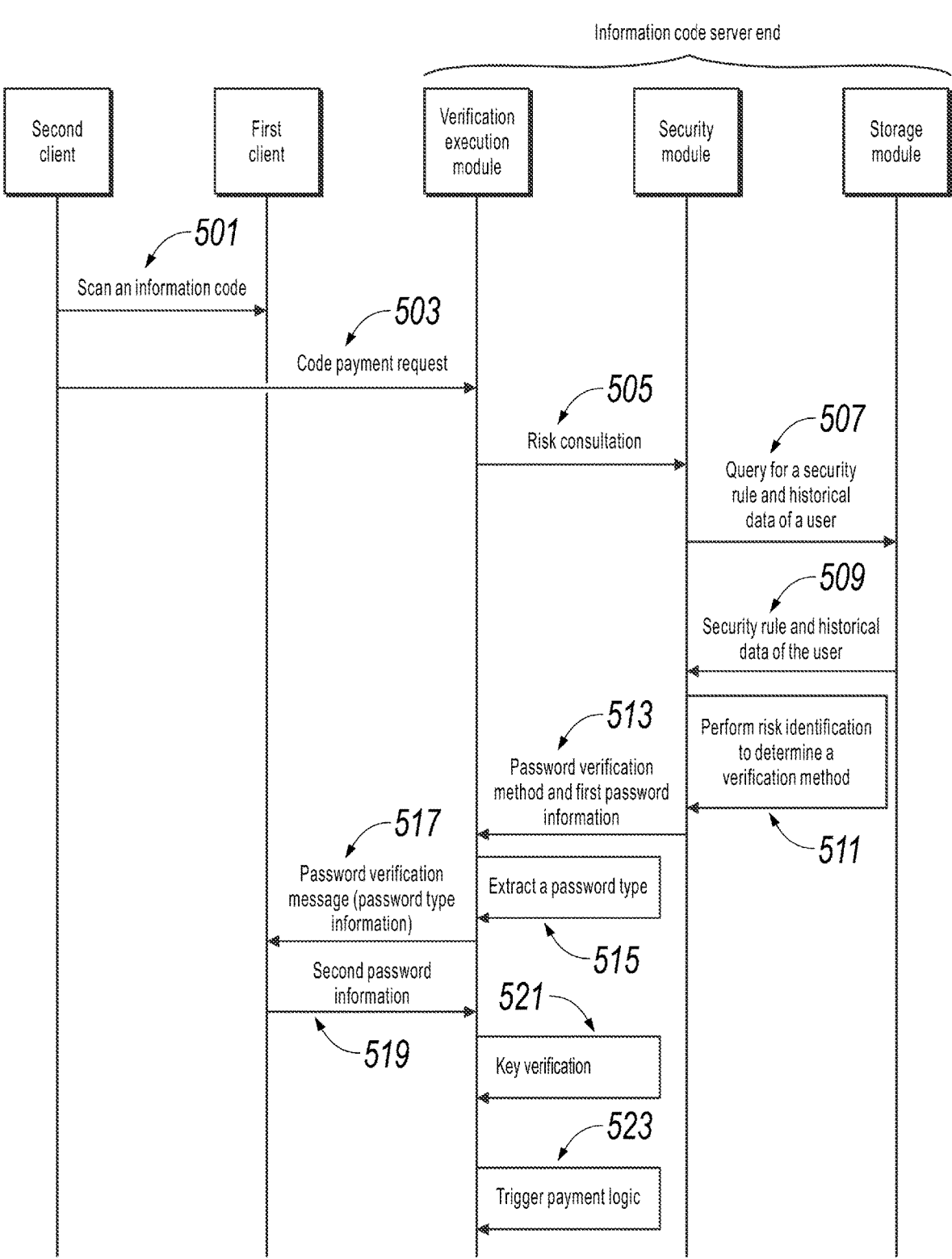
FIG. 5 is a flowchart illustrating use of a password verification method in a payment procedure, according to some embodiments.

FIG. 5 is a flowchart illustrating use of a password verification method in a payment procedure, according to some embodiments. As shown in FIG. 5, the procedure can include the following steps.

Step 501: A second client scans a third-party information code of a first client.

Step 503: The second client sends a code payment request to a verification execution module on an information code server end.

Step 505: The verification execution module performs risk consultation with a security module.

Step 507: The security module sends a query for a security rule and historical data of a user to a storage module.

Step 509: The storage module sends the security rule and the historical data of the user to the security module.

Step 511: The security module performs risk identification to determine a verification method to be used. In this procedure, it is determined that the password verification method is to be used.

For example, if the historical data of the user indicate that the user has modified a password, the historical data of the user include the latest first password information of the user.

Step 513: The security module sends information about using the password verification method and the first password information of the user to the verification execution module.

Step 515: The verification execution module extracts password type information from the first password information.

To be specific, the latest password type, for example, fingerprint information, face information, or a PIN password, used by the user is obtained from the first password information.

Step 517: The verification execution module sends a password verification message that includes the password type information to the first client.

After receiving the password verification message, the first client presents, to the user, an interface requesting the user to input a password of the type. For example, the user needs to input a fingerprint, a face, a PIN, etc. as second password information.

Step 519: The first client sends, to the verification execution module, the second password information input by the user based on the password type information.

Step 521: The verification execution module performs password verification by using the first password information and the second password information.

Step 523: Trigger payment logic after the verification succeeds.

Still further, after the password verification, information about current password verification after password modification can be further sent to the storage module. This part is recorded in the storage module as new historical data of the user.

Figure 6:
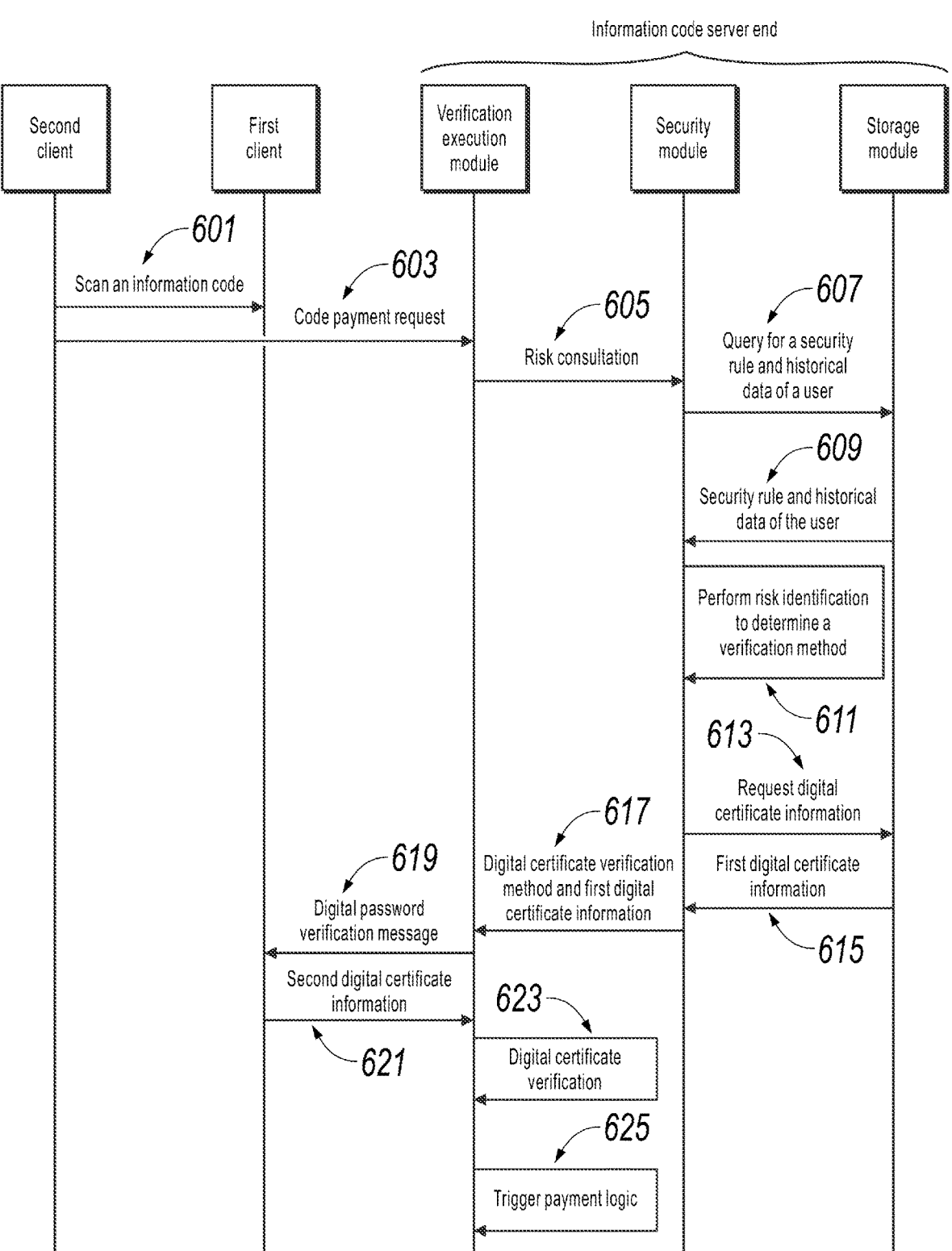
FIG. 6 is a flowchart illustrating use of a digital certificate verification method in a payment procedure, according to some embodiments.

FIG. 6 is a flowchart illustrating use of a digital certificate verification method in a payment procedure, according to some embodiments. As shown in FIG. 6, the procedure can include the following steps.

Step 601: A second client scans a third-party information code of a first client.

Step 603: The second client sends a code payment request to a verification execution module on an information code server end.

Step 605: The verification execution module performs risk consultation with a security module.

Step 607: The security module sends a query for a security rule and historical data of a user to a storage module.

Step 609: The storage module sends the security rule and the historical data of the user to the security module.

Step 611: The security module performs risk identification to determine a verification method to be used. In this procedure, it is determined that the digital certificate verification method is to be used.

For example, the historical data of the user indicate that the user has installed a digital certificate, and a payment amount exceeds X yuan. Therefore, it is determined that the digital certificate verification method needs to be used.

Step 613: The security module requests digital certificate information from the storage module.

Step 615: The storage module extracts first digital certificate information of the user based on a user identity, etc., and sends the first digital certificate information to the security module.

Step 617: The security module sends information about using the digital certificate verification method and the first digital certificate information to the verification execution module.

Step 619: The verification execution module sends a digital certificate verification message to the first client.

Step 621: The first client obtains local second digital certificate information, and sends the local second digital certificate information to the verification execution module.

After receiving the digital certificate verification message, the first client invokes information about a locally installed digital certificate as the second digital certificate information.

Step 623: The verification execution module performs verification by using the first digital certificate information and the second digital certificate information.

Step 625: Trigger payment logic after the verification succeeds.

In addition, in the above-mentioned verification procedure, if it is determined that the digital certificate verification method is to be used but the client does not install a digital certificate, the second client can be triggered to install the digital certificate to be used for the verification method. The payment logic is triggered after the second client installs the digital certificate.

Figure 7:
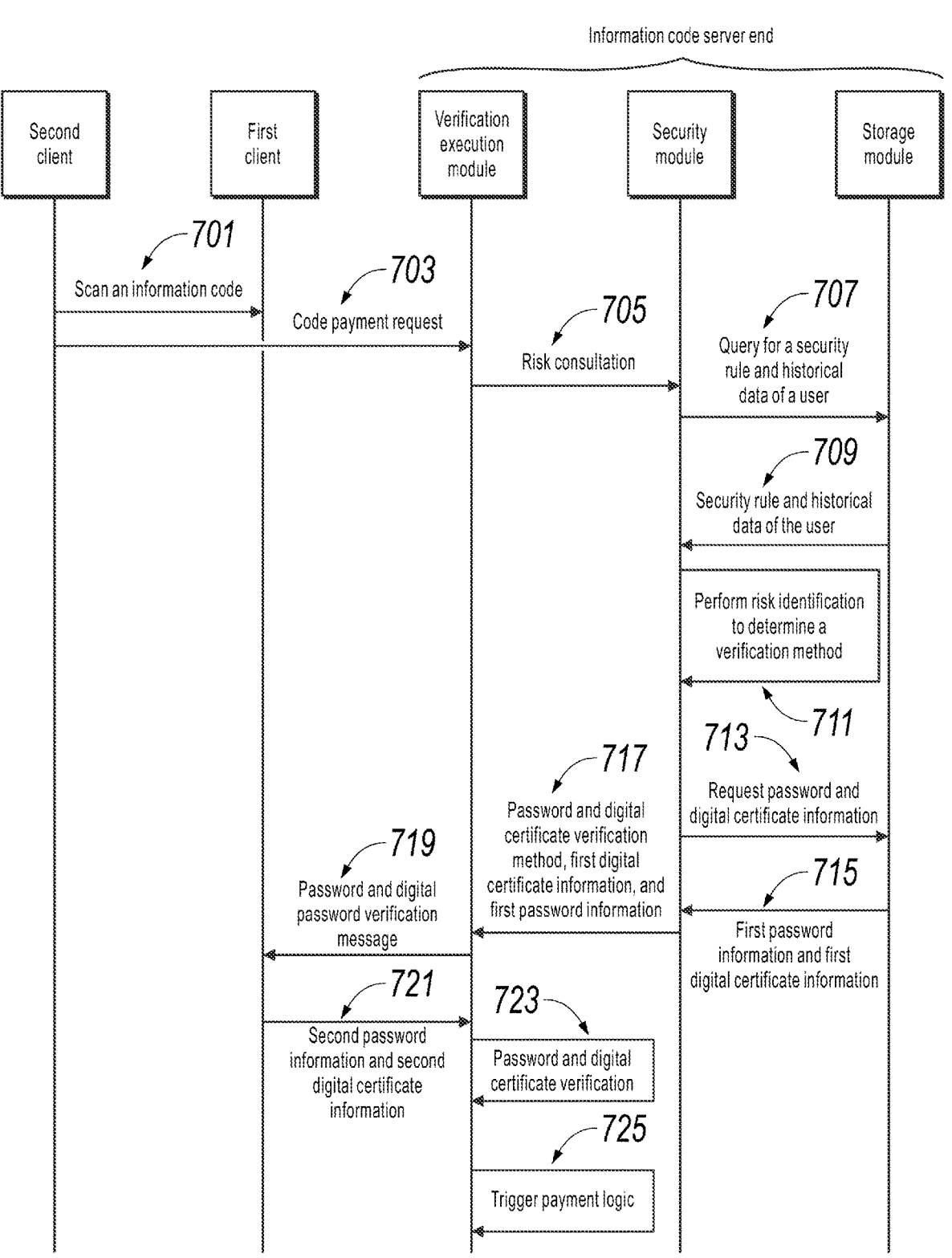
FIG. 7 is a flowchart illustrating use of a password and digital certificate verification method in a payment procedure, according to some embodiments.

FIG. 7 is a flowchart illustrating use of a password and digital certificate verification method in a payment procedure, according to some embodiments. As shown in FIG. 7, the procedure can include the following steps.

Step 701: A second client scans a third-party information code of a first client.

Step 703: The second client sends a code payment request to a verification execution module on an information code server end.

Step 705: The verification execution module performs risk consultation with a security module.

Step 707: The security module sends a query for a security rule and historical data of a user to a storage module.

Step 709: The storage module sends the security rule and the historical data of the user to the security module.

Step 711: The security module performs risk identification to determine a verification method to be used. In this procedure, it is determined that the password and digital certificate verification method is to be used.

Step 713: The security module requests password and digital certificate information from the storage module.

Step 715: The storage module extracts first password information and first digital certificate information of the user based on a user identity, etc., and sends the first password information and the first digital certificate information to the security module.

Step 717: The security module sends information about using the password and digital certificate verification method, the first password information, and the first digital certificate information to the verification execution module.

Step 719: The verification execution module sends a password and digital certificate verification message to the first client, where the message includes password type information.

After receiving the password and digital certificate verification message, the first client presents, to the user, an interface requesting the user to input a password of the type. For example, the user needs to input a fingerprint, a face, a PIN, etc. as second password information. In addition, the first client invokes information about a locally installed digital certificate as second digital certificate information.

Step 721: The first client obtains second password information input by the user and the local second digital certificate information, and sends the second password information and the local second digital certificate information to the verification execution module.

Step 723: The verification execution module performs verification by using the first password information, the second password information, the first digital certificate information, and the second digital certificate information.

It is considered that the verification is passed only when the password information and the digital certificate pass the verification.

Step 725: Trigger payment logic after the verification succeeds.

Figure 8:
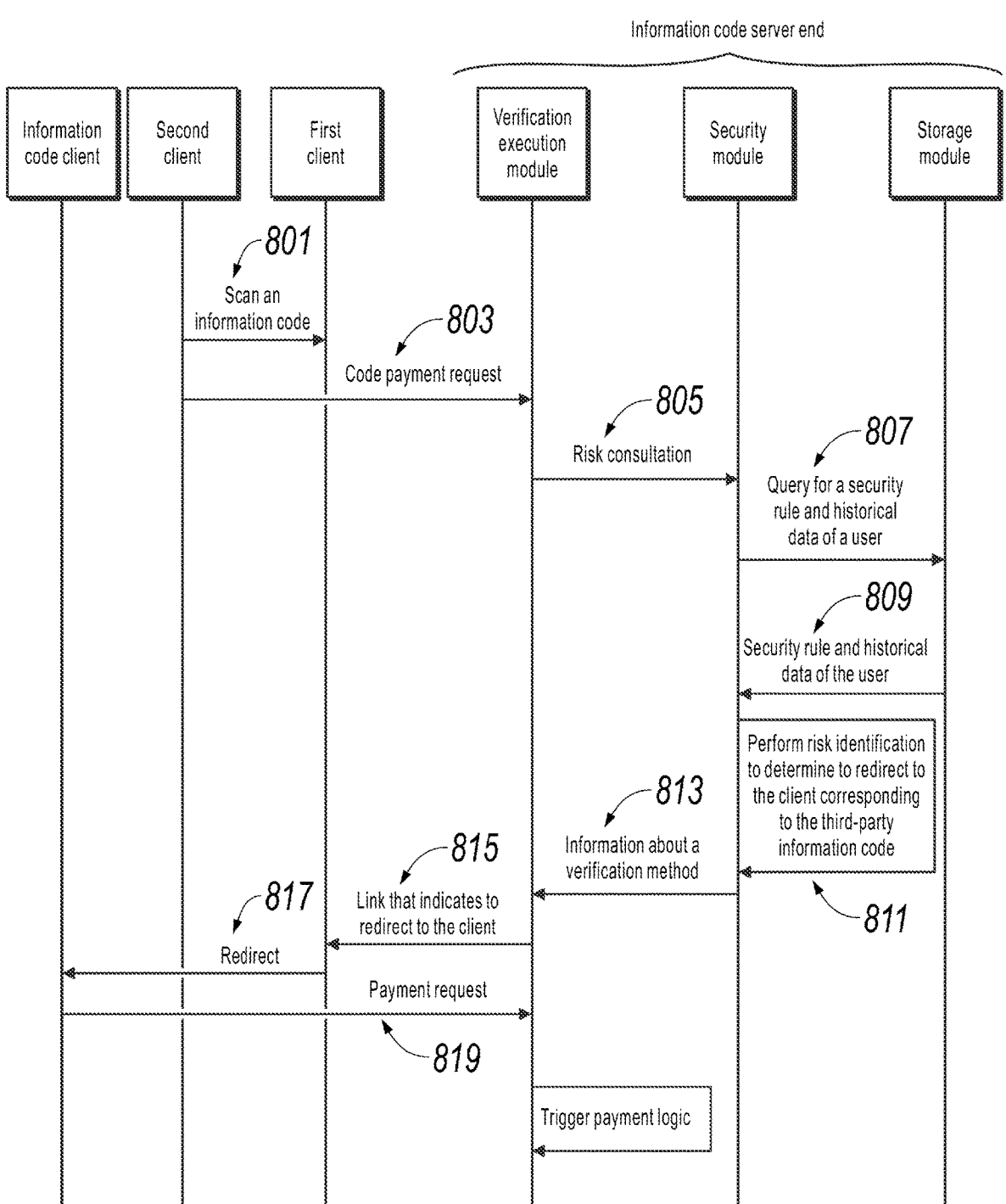
FIG. 8 is a flowchart illustrating a redirect to a third-party information code client in a payment procedure, according to some embodiments.

FIG. 8 is a flowchart illustrating a redirect to a third-party information code client in a payment procedure, according to some embodiments. As shown in FIG. 8, the procedure can include the following steps.

Step 801: A second client scans a third-party information code of a first client.

Step 803: The second client sends a code payment request to a verification execution module on an information code server end.

Step 805: The verification execution module performs risk consultation with a security module.

Step 807: The security module sends a query for a security rule and historical data of a user to a storage module.

Step 809: The storage module sends the security rule to the security module.

Step 811: The security module performs risk identification to determine to redirect to a client corresponding to the third-party information code.

For example, the historical data of the user are a payment limit set by the user, and a current payment amount exceeds the payment limit Therefore, a redirect is made to the client corresponding to the third-party information code.

Step 813: The security module sends information about the verification method to the verification execution module.

Step 815: The verification execution module sends, to the first client, a link that indicates to redirect to the client corresponding to the third-party information code.

Step 817: After the user taps the link, the first client redirects to the client corresponding to the third-party information code.

Step 819: The client corresponding to the third-party information code sends a payment request to the verification execution module, so that the verification execution module triggers payment logic.

It can be seen from the above-mentioned embodiments that in this application, the user identity can be verified by using different verification methods, so that security is improved as much as possible while user experience is ensured.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

Figure 9:
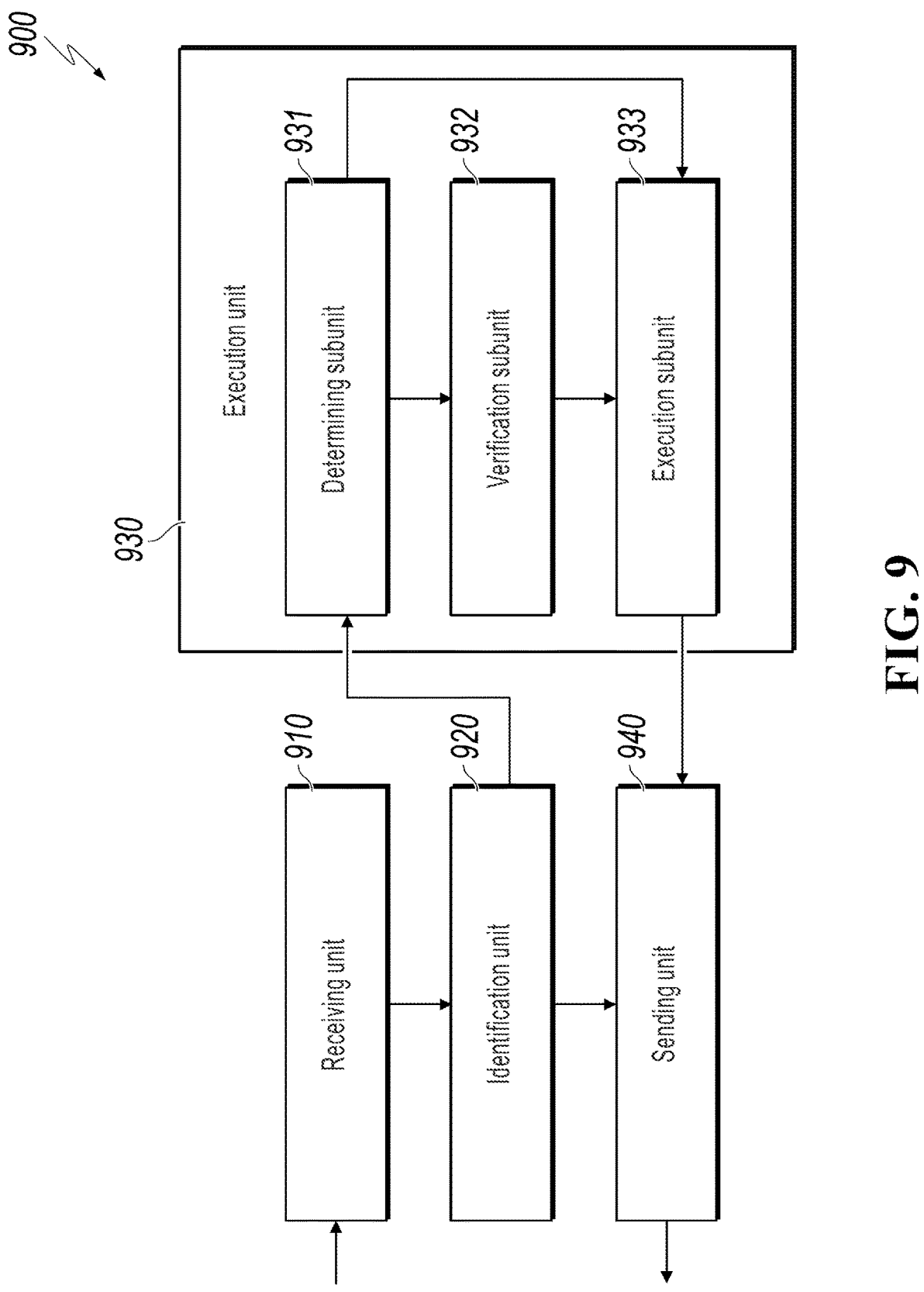
FIG. 9 is a schematic block diagram illustrating an information processing apparatus, according to some embodiments.

FIG. 9 is a schematic block diagram illustrating an information processing apparatus, according to some embodiments. The apparatus is disposed on an information code server end. As shown in FIG. 9, the apparatus 900 includes a receiving unit 910, an identification unit 920, an execution unit 930, and a sending unit 940. Main functions of the units are as follows.

The receiving unit 910 is configured to receive an information code processing request from a second client, where the information code processing request is sent after the second client scans a third-party information code embedded in a first client.

The identification unit 920 is configured to perform risk identification based on the information code processing request.

The execution unit 930 is configured to execute corresponding processing logic based on identified risk information and a predetermined security rule.

The sending unit 940 is configured to send a processing result of the processing logic to the first client.

In some implementations, the identification unit 920 is specifically configured to obtain the risk information through identification based on at least one of transaction information, device information, environment information, and time information that are included in the information code processing request; or query for historical data of a user based on user information included in the information code processing request, and obtain the risk information through identification based on the historical data of the user.

In some implementations, the execution unit 930 can include a determining subunit 931, a verification subunit 932, and an execution subunit 933.

The determining subunit 931 is configured to query for the predetermined security rule based on the identified risk information, to determine whether to perform security verification.

The verification subunit 932 is configured to: if the determining subunit 931 determines to perform security verification, perform security verification corresponding to the risk information.

The execution subunit 933 is configured to: if the security verification is passed, execute the processing logic corresponding to the information code; or if the determining subunit 931 determines not to perform security verification, execute the processing logic corresponding to the information code.

The security verification can include but is not limited to user confirmation, password verification, digital certificate verification, password and digital certificate verification, or a redirect to a client corresponding to the third-party information code.

In some implementations, when performing password verification, the verification subunit 932 is specifically configured to determine, based on user information included in the information code processing request, password type information and first password information that are most recently set by a user; send a password verification message that includes the password type information to the first client; and obtain second password information sent by the first client, and perform verification by using the second password information and the first password information.

In some other implementations, when performing digital certificate verification, the verification subunit 932 is specifically configured to determine, based on user information included in the information code processing request, first digital certificate information corresponding to the user information; send a message for verifying a digital certificate to the first client; and obtain second digital certificate information sent by the first client, and perform verification by using the second digital certificate information and the first digital certificate information.

In still some other implementations, when performing password and digital certificate verification, the verification subunit 932 is specifically configured to determine, based on user information included in the information code processing request, password type information, first password information, and first digital certificate information that correspond to the user information; send a message for verifying a password and a digital certificate to the first client; and obtain second password information and second digital certificate information that are sent by the first client, and perform verification by using the first password information, the second password information, the first digital certificate information, and the second digital certificate information.

It is worthwhile to note that the units and the subunits in the above-mentioned apparatus can be disposed in one device or module for implementation, or can be disposed in a plurality of devices or modules for implementation. For example, the receiving unit 910, the sending unit 940, the verification subunit 932, and the execution subunit 933 can be disposed in the verification execution module in the embodiments shown in FIG. 4 to FIG. 8. The identification unit 920 and the determining subunit 931 can be disposed in the security module in the embodiments shown in FIG. 4 to FIG. 8.

Figure 10:
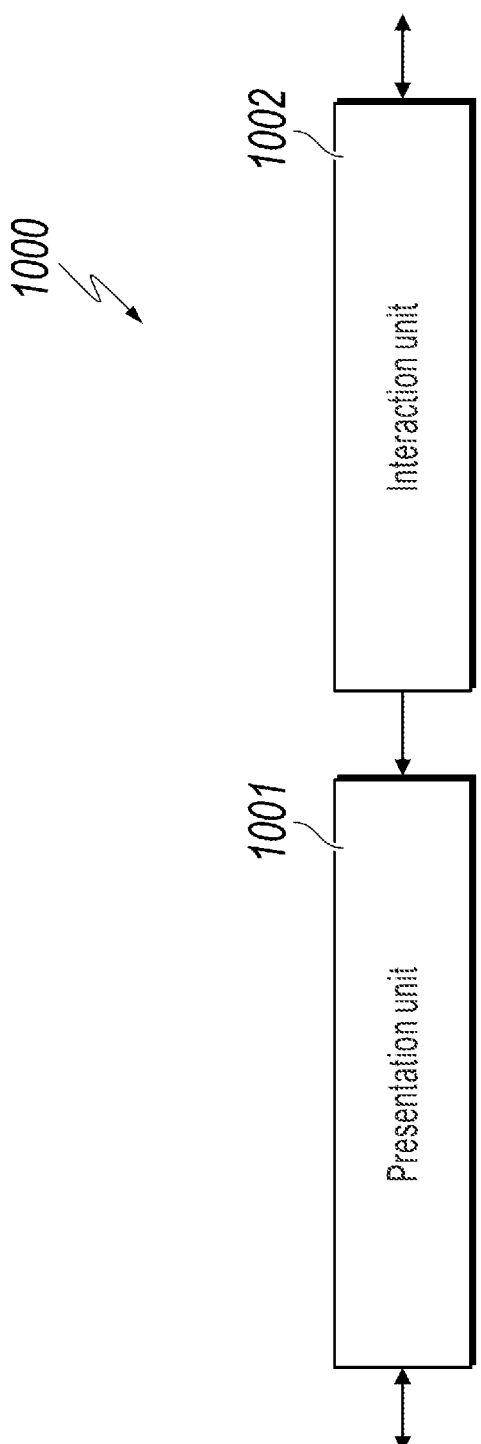
FIG. 10 is a schematic block diagram illustrating an information processing apparatus, according to some other embodiments.

FIG. 10 is a schematic block diagram illustrating an information processing apparatus, according to some other embodiments. The apparatus is disposed on a first client. As shown in FIG. 10, the apparatus 1000 includes a presentation unit 1001 and an interaction unit 1002. Main functions of the units are as follows.

The presentation unit 1001 is configured to: in response to a trigger event of opening a third-party information code, present an interface that includes the third-party information code, so that a second client scans the third-party information code, and triggers processing logic of the third-party information code.

The interaction unit 1002 is configured to obtain a processing result of the processing logic.

The presentation unit 1001 is further configured to present an interface that includes the processing result.

The trigger event of opening the third-party information code can include the following: a user triggers a component for opening the third-party information code in the first client; or a user performs a predetermined gesture operation on a lock screen.

In feasible methods, when presenting the interface that includes the processing result, the presentation unit 1001 is specifically configured to redirect from a current interface to the interface that includes the processing result; or present, in a form of a notification message, an interface that includes the processing result.

Still further, the interaction unit 1002 can be configured to receive a password verification message that includes password type information and is sent by the information code server end, and send, to the information code server end, second password information input by the user; or receive a message that is used for verifying a digital certificate and is sent by the information code server end, and send second digital certificate information to the information code server end; or receive a message that is used for verifying a password and a digital certificate and is sent by the information code server end, and send second digital certificate information to the information code server end, where the message includes the password type information.

The presentation unit 1001 is further configured to: after the interaction unit 1002 receives the password verification message that includes the password type information and the message for verifying a password and a digital certificate, present a prompt interface for inputting a password of a corresponding type.

According to some embodiments of another aspect, a computer-readable storage medium is further provided. The computer-readable storage medium stores a computer program, and when the computer program is executed on a computer, the computer is enabled to perform the method described in FIG. 1 or FIG. 3.

According to some embodiments of still another aspect, a computing device is further provided, including a memory and a processor. The memory stores executable code, and when executing the executable code, the processor implements the method described in FIG. 1 or FIG. 3.

The embodiments in this specification are described in a progressive way. For same or similar parts of the embodiments, mutual references can be made to the embodiments. Each embodiment focuses on a difference from other embodiments. In particular, the apparatus embodiments are basically similar to the method embodiments, and therefore are described briefly. For related parts, references can be made to related descriptions in the method embodiments.

A person skilled in the art should be aware that, in the above-mentioned one or more examples, functions described in this application can be implemented by hardware, software, firmware, or any combination thereof. When being implemented by software, these functions can be stored in a computer-readable medium or transmitted as one or more instructions or codes in the computer-readable medium.

The specific implementations mentioned above provide further detailed explanations of the objectives, technical solutions, and beneficial effects of this application. It should be understood that the above-mentioned descriptions are merely specific implementations of this application and are not intended to limit the protection scope of this application. Any modifications, equivalent replacements, improvements, etc. made on the basis of the technical solutions of this application should all fall within the protection scope of this application.

What is claimed is:

1. A computer-implemented method for information processing, comprising:

performed by an information code server end:

receiving an information code processing request from a second client, wherein the information code processing request is sent after the second client scans a third-party information code embedded in a first client;

performing risk identification based on the information code processing request to obtain identified risk information;

executing corresponding processing logic based on the identified risk information and a predetermined security rule; and sending a processing result of the corresponding processing logic to the first client.

2. The computer-implemented method of claim 1, wherein performing, to obtain identified risk information, risk identification based on the information code processing request comprises:

obtaining the identified risk information through identification based on at least one of transaction information, device information, environment information, and time information that are comprised in the information code processing request; and querying for historical data of a user based on user information comprised in the information code processing request and obtaining the identified risk information through identification based on the historical data of the user.

3. The computer-implemented method of claim 1, wherein executing corresponding processing logic based on identified risk information and a predetermined security rule comprises:

querying for the predetermined security rule based on the identified risk information, to determine whether to perform security verification; and in response to determining to perform security verification, performing security verification corresponding to the identified risk information, and then executing processing logic corresponding to the third-party information code, wherein the security verification comprises user confirmation, password verification, digital certificate verification, password and digital certificate verification, or a redirect to a client corresponding to the third-party information code; or in response to determining not to perform security verification, executing processing logic corresponding to the third-party information code.

4. The computer-implemented method of claim 3, wherein:

the password verification comprises:

determining, based on user information comprised in the information code processing request, password type information and first password information that are most recently set by a user;

sending a password verification message that comprises the password type information to the first client; and obtaining second password information sent by the first client, and performing verification by using the second password information and the first password information.

5. The computer-implemented method of claim 4, wherein the digital certificate verification comprises:

determining, based on the user information comprised in the information code processing request, first digital certificate information corresponding to the user information;

sending a message for verifying a digital certificate to the first client; and obtaining second digital certificate information sent by the first client, and performing verification by using the second digital certificate information and the first digital certificate information.

6. The computer-implemented method of claim 4, wherein the password and digital certificate verification comprises:

determining, based on user information comprised in the information code processing request, password type information, first password information, and first digital certificate information that correspond to the user information;

sending a message for verifying a password and a digital certificate to the first client; and obtaining second password information and second digital certificate information that are sent by the first client, and performing verification by using the first password information, the second password information, the first digital certificate information, and the second digital certificate information.

7. The computer-implemented method of claim 1, wherein:

the third-party information code comprises a payment code and the processing logic corresponding to the third-party information code comprises payment processing.

8. A non-transitory, computer-readable medium storing one or more instructions executable by an information code server end to perform one or more operations for information processing, the one or more instructions, when executed by the information code server end, perform the one or more operations, comprising:

receiving an information code processing request from a second client, wherein the information code processing request is sent after the second client scans a third-party information code embedded in a first client;

performing risk identification based on the information code processing request to obtain identified risk information;

executing corresponding processing logic based on the identified risk information and a predetermined security rule; and sending a processing result of the corresponding processing logic to the first client.

9. The non-transitory, computer-readable medium of claim 8, wherein performing, to obtain identified risk information, risk identification based on the information code processing request comprises:

obtaining the identified risk information through identification based on at least one of transaction information, device information, environment information, and time information that are comprised in the information code processing request; and querying for historical data of a user based on user information comprised in the information code processing request and obtaining the identified risk information through identification based on the historical data of the user.

10. The non-transitory, computer-readable medium of claim 8, wherein executing corresponding processing logic based on identified risk information and a predetermined security rule comprises:

querying for the predetermined security rule based on the identified risk information, to determine whether to perform security verification; and in response to determining to perform security verification, performing security verification corresponding to the identified risk information, and then executing processing logic corresponding to the third-party information code, wherein the security verification comprises user confirmation, password verification, digital certificate verification, password and digital certificate verification, or a redirect to a client corresponding to the third-party information code; or in response to determining not to perform security verification, executing processing logic corresponding to the third-party information code.

11. The non-transitory, computer-readable medium of claim 10, wherein:

the password verification comprises:

determining, based on user information comprised in the information code processing request, password type information and first password information that are most recently set by a user;

sending a password verification message that comprises the password type information to the first client; and obtaining second password information sent by the first client, and performing verification by using the second password information and the first password information.

12. The non-transitory, computer-readable medium of claim 11, wherein the digital certificate verification comprises:

determining, based on the user information comprised in the information code processing request, first digital certificate information corresponding to the user information;

sending a message for verifying a digital certificate to the first client; and obtaining second digital certificate information sent by the first client, and performing verification by using the second digital certificate information and the first digital certificate information.

13. The non-transitory, computer-readable medium of claim 11, wherein the password and digital certificate verification comprises:

determining, based on user information comprised in the information code processing request, password type information, first password information, and first digital certificate information that correspond to the user information;

sending a message for verifying a password and a digital certificate to the first client; and obtaining second password information and second digital certificate information that are sent by the first client, and performing verification by using the first password information, the second password information, the first digital certificate information, and the second digital certificate information.

14. The non-transitory, computer-readable medium of claim 8, wherein:

the third-party information code comprises a payment code and the processing logic corresponding to the third-party information code comprises payment processing.

15. A computer-implemented system for information processing, comprising:

one or more computers of an information code server end; and one or more computer memory devices interoperably coupled with the one or more computers and having tangible, non-transitory, machine-readable media storing one or more instructions that, when executed by the one or more computers, perform one or more operations, comprising:

receiving an information code processing request from a second client, wherein the information code processing request is sent after the second client scans a third-party information code embedded in a first client;

performing risk identification based on the information code processing request to obtain identified risk information;

executing corresponding processing logic based on the identified risk information and a predetermined security rule; and sending a processing result of the corresponding processing logic to the first client.

16. The computer-implemented system of claim 15, wherein performing, to obtain identified risk information, risk identification based on the information code processing request comprises:

obtaining the identified risk information through identification based on at least one of transaction information, device information, environment information, and time information that are comprised in the information code processing request; and querying for historical data of a user based on user information comprised in the information code processing request and obtaining the identified risk information through identification based on the historical data of the user.

17. The computer-implemented system of claim 15, wherein executing corresponding processing logic based on identified risk information and a predetermined security rule comprises:

querying for the predetermined security rule based on the identified risk information, to determine whether to perform security verification; and in response to determining to perform security verification, performing security verification corresponding to the identified risk information, and then executing processing logic corresponding to the third-party information code, wherein the security verification comprises user confirmation, password verification, digital certificate verification, password and digital certificate verification, or a redirect to a client corresponding to the third-party information code; or in response to determining not to perform security verification, executing processing logic corresponding to the third-party information code.

18. The computer-implemented system of claim 17, wherein: the password verification comprises:

determining, based on user information comprised in the information code processing request, password type information and first password information that are most recently set by a user;

sending a password verification message that comprises the password type information to the first client; and obtaining second password information sent by the first client, and performing verification by using the second password information and the first password information.

19. The computer-implemented system of claim 18, wherein the digital certificate verification comprises:

determining, based on the user information comprised in the information code processing request, first digital certificate information corresponding to the user information;

sending a message for verifying a digital certificate to the first client; and obtaining second digital certificate information sent by the first client, and performing verification by using the second digital certificate information and the first digital certificate information.

20. The computer-implemented system of claim 18, wherein the password and digital certificate verification comprises:

determining, based on user information comprised in the information code processing request, password type information, first password information, and first digital certificate information that correspond to the user information;

sending a message for verifying a password and a digital certificate to the first client; and obtaining second password information and second digital certificate information that are sent by the first client, and performing verification by using the first password information, the second password information, the first digital certificate information, and the second digital certificate information.

* * * * *